US011374952B1

(12) United States Patent
Coskun et al.

(10) Patent No.: US 11,374,952 B1
(45) Date of Patent: Jun. 28, 2022

(54) DETECTING ANOMALOUS EVENTS USING AUTOENCODERS

(71) Applicant: Amazon Technologies, Inc., Seattle, WA (US)

(72) Inventors: Baris Coskun, Glen Rock, NJ (US); Wei Ding, Issaquah, WA (US); Luca Melis, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 462 days.

(21) Appl. No.: 16/586,147

(22) Filed: Sep. 27, 2019

(51) Int. Cl.
| | |
|---|---|
| *H04L 29/06* | (2006.01) |
| *H04L 9/40* | (2022.01) |
| *G06N 3/04* | (2006.01) |
| *G06N 3/08* | (2006.01) |

(52) U.S. Cl.
CPC ....... *H04L 63/1425* (2013.01); *G06N 3/0454* (2013.01); *G06N 3/08* (2013.01); *H04L 63/1416* (2013.01)

(58) Field of Classification Search
CPC ... H04L 63/1425; H04L 63/1416; G06N 3/08; G06N 3/0454
See application file for complete search history.

(56) References Cited

U.S. PATENT DOCUMENTS

| | | | | |
|---|---|---|---|---|
| 10,121,104 | B1 * | 11/2018 | Hu | G06N 3/0454 |
| 11,106,903 | B1 * | 8/2021 | Huynh | G06V 10/50 |
| 2017/0220836 | A1 * | 8/2017 | Phillips | G06V 40/1376 |
| 2017/0330068 | A1 * | 11/2017 | Yu | G06N 3/0454 |
| 2021/0319240 | A1 * | 10/2021 | Demir | G06N 3/0445 |
| 2021/0342570 | A1 * | 11/2021 | Gregson | G06K 9/6269 |

OTHER PUBLICATIONS

Bhattad, Anand, Jason Rock, and David Forsyth. "Detecting anomalous faces with'no peeking'autoencoders." arXiv preprint arXiv: 1802.05798 (2018). (Year: 2018).*
Dan Xu, Yan Yan, Elisa Ricci, Nicu Sebe, "Detecting anomalous events in videos by learning deep representations of appearance and motion", Computer Vision and Image Understanding, vol. 156, 2017, pp. 117-127, ISSN 1077-3142 (Year: 2017).*

(Continued)

*Primary Examiner* — Chau Le
(74) *Attorney, Agent, or Firm* — Patterson + Sheridan, LLP

(57) ABSTRACT

Techniques for monitoring a computing environment for anomalous activity are presented. An example method includes receiving a request to invoke an action within a computing environment, with the request including a plurality of request attributes and a plurality of contextual attributes. A normalcy score is generated for the received request by encoding the received request into a code in latent space of an autoencoder, reconstructing the request from the code, and generating a probability distribution indicating a likelihood that the reconstructed request attributes exist in a data set of non-anomalous activity. Based on the calculated normalcy score, one or more actions are taken to process the request such that execution of non-anomalous requests is allowed, and execution of potentially anomalous requests may be blocked pending confirmation.

20 Claims, 9 Drawing Sheets

(56) References Cited

OTHER PUBLICATIONS

Charu C. Aggarwal and Philip S. Yu. Outlier detection for high dimensional data. In Proceedings of the 2001 ACM SIGMOD International Conference on Management of Data, SIGMOD '01, pp. 37-46, New York, NY, USA, 2001. ACM.

Jinwon An and Sungzoon Cho. Variational autoencoder based anomaly detection using recon-struction probability. 2015.

Richard J. Bolton, David J. Hand, and David J. H. Unsupervised profiling methods for fraud detection. In Proc. Credit Scoring and Credit Control VII, pp. 5-7, 2001.

Markus M Breunig, Hans-Peter Kriegel, Raymond T Ng, and Jörg Sander. Lof: identifying density-based local outliers. In ACM sigmod record, vol. 29, pp. 93-104. ACM, 2000.

Varun Chandola, Arindam Banerjee, and Vipin Kumar. Anomaly detection: A survey. ACM Comput. Surv., 41 (3):15:1-15:58, Jul. 2009.

Ting Chen, Lu An Tang, Yizhou Sun, Zhengzhang Chen, and Kai Zhang. Entity embedding-based anomaly detection for heterogeneous categorical events. In Proceedings of the Twenty-Fifth International Joint Conference on Artificial Intelligence, IJCAI 2016, New York, NY, USA, Jul. 9-15, 2016, pp. 1396-1403, 2016.

Kaustav Das and Jeff Schneider. Detecting anomalous records in categorical datasets. In Proceedings of the 13th ACM SIGKDD International Conference on Knowledge Discovery and Data Mining, KDD '07, pp. 220-229, New York, NY, USA, 2007. ACM.

Lian Duan, Lida Xu, Ying Liu, and Jun Lee. Cluster-based outlier detection. Annals of Operations Research, 168(1):151-168, 2009. (Abstract Only).

Ran El-Yaniv and Mordechai Nisenson. Optimal single-class classification strategies. In Advances in Neural Information Processing Systems 19, Proceedings of the Twentieth Annual Conference on Neural Information Processing Systems, Vancouver, British Columbia, Canada, Dec. 4-7, 2006, pp. 377-384, 2006.

Tom Fawcett and Foster Provost. Activity monitoring: Noticing interesting changes in behavior. In Proceedings of the Fifth ACM SIGKDD International Conference on Knowledge Discovery and Data Mining, KDD '99, pp. 53-62, New York, NY, USA, 1999. ACM.

Arthur Gretton, Karsten M Borgwardt, Malte J Rasch, Bernhard Schölkopf, and Alexander Smola. A kernel two-sample test. Journal of Machine Learning Research, 2012.

Sudipto Guha, Nina Mishra, Gourav Roy, and Okke Schrijvers. Robust random cut forest based anomaly detection on streams. In Proceedings of the 33rd International Conference on International Conference on Machine Learning—vol. 48, ICML'16, pp. 2712-2721. JMLR.org, 2016.

Michael Gutmann and Aapo Hyvärinen. Noise-contrastive estimation: A new estimation principle for unnormalized statistical models. In Proceedings of the Thirteenth International Conference on Artificial Intelligence and Statistics, AISTATS 2010, Chia Laguna Resort, Sar-dinia, Italy, May 13-15, 2010, pp. 297-304, 2010.

Aapo Hyvärinen. Estimation of non-normalized statistical models by score matching. Journal of Machine Learning Research, 6:695-709, 2005.

Diederik P. Kingma. Stochastic gradient vb and the variational auto-encoder. 2014.

Diederik P Kingma and Max Welling. Auto-encoding variational bayes. In ICLR, 2014.

Kun-Lun Li, Hou-Kuan Huang, Sheng-Feng Tian, and Wei Xu. Improving one-class svm for anomaly detection. In Machine Learning and Cybernetics, 2003 International Conference on, vol. 5, pp. 3077-3081. IEEE, 2003 (Abstract Only).

Fei Tony Liu, Kai Ming Ting, and Zhi-Hua Zhou. Isolation forest. In 2008 Eighth IEEE International Conference on Data Mining, pp. 413-422. IEEE, 2008.

Tomas Mikolov, Kai Chen, Greg Corrado, and Jeffrey Dean. Efficient estimation of word representations in vector space. CoRR, abs/1301.3781, 2013.

Andriy Mnih and Koray Kavukcuoglu. Learning word embeddings efficiently with noise-contrastive estimation. In Proceedings of the 26th International Conference on Neural Informa-tion Processing Systems—vol. 2, NIPS'13, pp. 2265-2273, USA, 2013. Curran Associates Inc.

Andriy Mnih and Yee Whye Teh. A fast and simple algorithm fortraining neural probabilistic language models. In In Proceedings of the International Conference on Machine Learning, 2012.

Jeffrey Pennington, Richard Socher, and Christopher Manning. Glove: Global vectors for word representation. In Proceedings of the 2014 conference on empirical methods in natural language processing (EMNLP), pp. 1532-1543, 2014.

Danilo Jimenez Rezende, Shakir Mohamed, and Daan Wierstra. Stochastic backpropagation and approximate inference in deep generative models. In Proceedings of the 31st International Conference on International Conference on Machine Learning (ICML), ICML'14, pp. II-1278-II-1286. JMLR.org, 2014.

Kihyuk Sohn, Honglak Lee, and Xinchen Yan. Learning structured output representation using deep conditional generative models. In C. Cortes, N. D. Lawrence, D. D. Lee, M. Sugiyama, and R. Garnett, editors, Advances in Neural Information Processing Systems 28, pp. 3483-3491. Curran Associates, Inc., 2015.

Xiuyao Song, Mingxi Wu, Christopher M. Jermaine, and Sanjay Ranka. Conditional anomaly detection. IEEE Trans. Knowl. Data Eng., 19(5):631-645, 2007.

Ingo Steinwart, Don Hush, and Clint Scovel. A classification framework for anomaly detection. J. Mach. Learn. Res., 6:211-232, Dec. 2005.

H.S. Teng, K. Chen, and S. C. Lu. Adaptive real-time anomaly detection using inductively generated sequential patterns. In Proceedings of the 1990 IEEE Symposium on Research in Computer Security and Privacy, pp. 278-284, 1990.

Ilya Tolstikhin, Olivier Bousquet, Sylvain Gelly, and Bernhard Schoelkopf. Wasserstein auto-encoders. In arXiv preprint arXiv:1711.01558, 2017.

Junyuan Xie, Ross Girshick, and Ali Farhadi. Unsupervised deep embedding for clustering analysis. In Proceedings of the 33rd International Conference on International Conference on Machine Learning—vol. 48, ICML'16, pp. 478-487. JMLR.org, 2016.

Haowen Xu, Wenxiao Chen, Nengwen Zhao, Zeyan Li, Jiahao Bu, Zhihan Li, Ying Liu, Youjian Zhao, Dan Pei, Yang Feng, Jie Chen, Zhaogang Wang, and Honglin Qiao. Unsupervised anomaly detection via variational auto-encoder for seasonal kpis in web applications. In Proceedings of the 2018 World Wide Web Conference, WWW '18, pp. 187-196, Republic and Canton of Geneva, Switzerland, 2018. International World Wide Web Conferences Steering Committee.

Bo Yang, Xiao Fu, and Nicholas D. Sidiropoulos. Learning from hidden traits: Joint factor analysis and latent clustering. IEEE Trans. Signal Processing, 65(1):256-269, 2017.

Bo Yang, Xiao Fu, Nicholas D. Sidiropoulos, and Mingyi Hong. Towards k-means-friendly spaces: Simultaneous deep learning and clustering. In Proceedings of the 34th International Conference on Machine Learning, ICML 2017, Sydney, NSW, Australia, Aug. 6-11, 2017, pp. 3861-3870, 2017.

Jianwei Yang, Devi Parikh, and Dhruv Batra. Joint unsupervised learning of deep representations and image clusters. In 2016 IEEE Conference on Computer Vision and Pattern Recognition, CVPR 2016, Las Vegas, NV, USA, Jun. 27-30, 2016, pp. 5147-5156, 2016.

Shuangfei Zhai, Yu Cheng, Weining Lu, and Zhongfei Zhang. Deep structured energy based models for anomaly detection. In Proceedings of the 33rd International Conference on Interna-tional Conference on Machine Learning—vol. 48, ICML'16, pp. 1100-1109. JMLR.org, 2016.

Manqi Zhao and Venkatesh Saligrama. Anomaly detection with score functions based on nearest neighbor graphs. In Advances in neural information processing systems, pp. 2250-2258, 2009.

Chong Zhou and Randy C Paffenroth. Anomaly detection with robust deep autoencoders. In Proceedings of the 23rd ACM SIGKDD International Conference on Knowledge Discovery and Data Mining, pp. 665-674. ACM, 2017. (Abstract Only).

Mengxiao Zhu, Charu C. Aggarwal, Shuai Ma, Hui Zhang, and Jinpeng Huai. Outlier detection in sparse data with factorization

(56) References Cited

OTHER PUBLICATIONS machines. In Proceedings of the 2017 ACM on Conference on Information and Knowledge Management, CIKM 2017, Singapore, Nov. 6-10, 2017, pp. 817-826, 2017. (Abstract Only).
Bo Zong, Qi Song, Martin Renqiang Min, Wei Cheng, Cristian Lumezanu, Daeki Cho, and Haifeng Chen. Deep autoencoding gaussian mixture model for unsupervised anomaly detection. 2018.

* cited by examiner

_US 11,374,952 B1_

DETECTING ANOMALOUS EVENTS USING AUTOENCODERS

BACKGROUND

The present invention relates to detecting anomalous events in a distributed computing system, and more specifically, to using autoencoders trained on user activity within the distributed computing system to identify potentially anomalous events based on reconstructions of these events through the autoencoders and to take action to respond to such potentially anomalous events.

DETAILED DESCRIPTION

Figure 1:
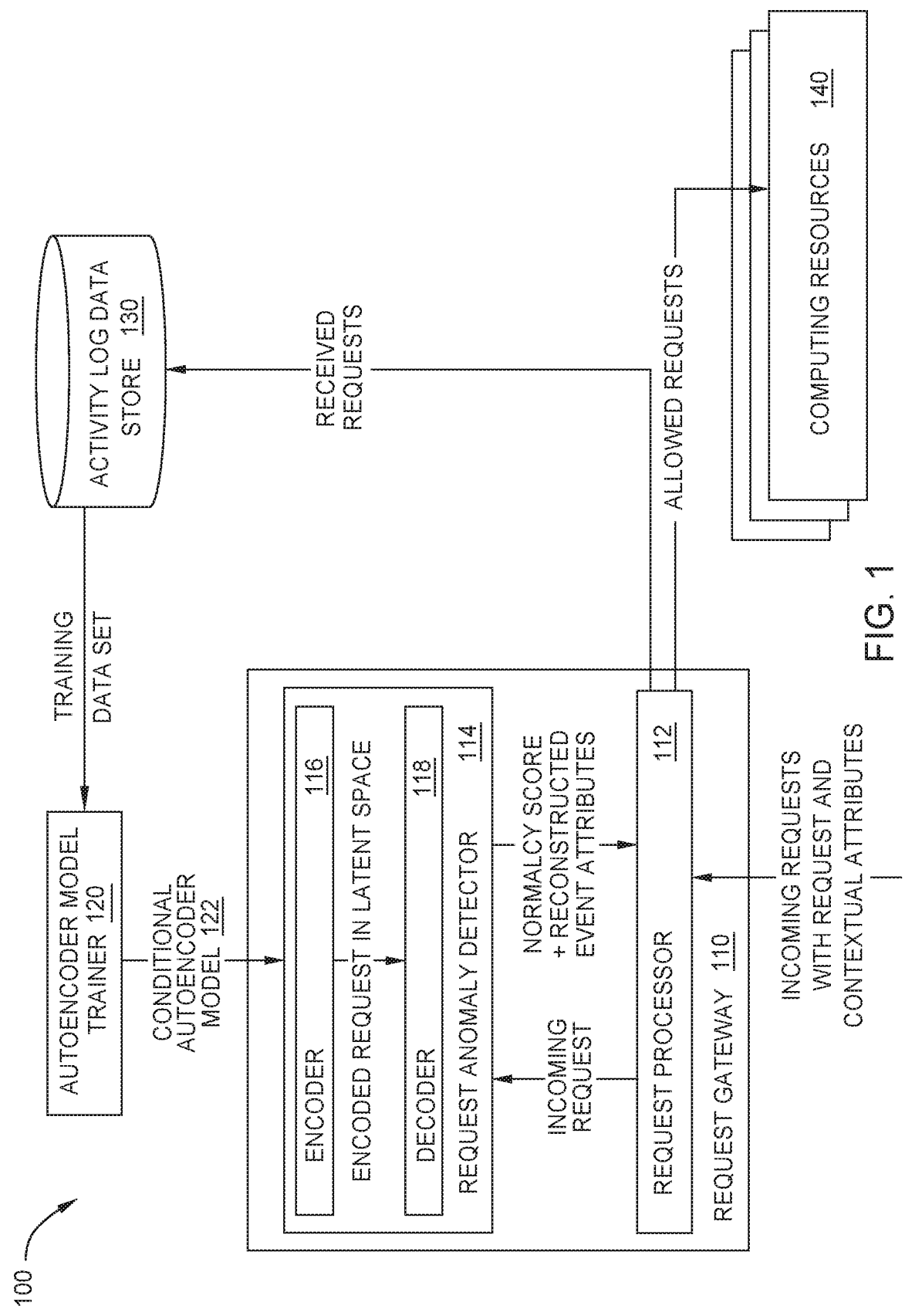
FIG. 1 illustrates an example distributed computing environment in which an autoencoder is used to determine whether incoming requests to perform actions within the distributed computing environment are potentially anomalous actions, according to one embodiment.

Embodiments described herein describe techniques for using trained autoencoders, such as variational autoencoders, Wasserstein autoencoders, or other models that encode data into a latent space and reconstruct approximations of the data from an encoding in the latent space, to recognize potentially anomalous activity within a distributed computing system based on historical user activity within the distributed computing system. Generally, users of a distributed computing system may perform actions within the distributed computing system according to a pattern of activity. For example, users may request the creation and termination of cloud computing instances in the distributed computing system according to a roughly defined schedule, such as the beginning and end of a work day. In another example, users may log into and out of the distributed computing system at particular times and from particular locations. Because users of a distributed computing system generally perform various actions according to a regular pattern of activity, it may be assumed that future requests that have similar attributes as the attributes of historical requests is likely non-anomalous activity. Similarly, requests having attributes that are significantly different from the attributes of historical requests may constitute potentially anomalous activity, and thus may be subject to further examination prior to allowing or disallowing processing of the request.

Generally, user activity includes a large number of records, and each record may include highly dimensional attributes describing each record. These attributes may include various data points that may be used to determine whether a request is non-anomalous or potentially anomalous. Some of the attributes may also be highly dimensional, such as information identifying the system from which a request was received, which may have $2^{32}$ possible values for IPv4 addresses or $2^{128}$ possible values for IPv6 addresses. Further, various aspects of user activity may complicate determinations of whether requests in a computing system are potentially anomalous or non-anomalous. For example, some requests may be anomalous with respect to a global data set of historical requests to invoke actions in a distributed computing environment. However, that a request may be anomalous within the global set of historical requests, a request that may be anomalous with respect to a global data set may not necessarily indicate that such a request is actually anomalous for the specific user associated with the request. In another example, numerous users may perform activity consistent with pattern; however, this pattern of activity may be anomalous for a user that does not operate on the same schedule.

To determine whether requests to perform actions within a distributed computing environment are potentially anomalous with respect to a particular user of the distributed computing environment, embodiments presented herein use normalcy scores predicted for a generated reconstruction of an incoming request by an autoencoder. Generally, the normalcy scores may indicate a relative closeness of the attributes of the incoming request with attributes of the closest matching requests in a training data set. Based on the generated normalcy score for a request, a determination of whether the request is potentially anomalous or non-anomalous may be performed. For each incoming request, a system can allow or disallow performance of the requested action based on the generated normalcy score. For example, incoming requests that result in the generation of normalcy scores indicative of a similarity to other events known to have been non-anomalous events (e.g., a probability approaching 1 that a similar request has been previously performed within the distributed computing environment) may be considered to be non-anomalous requests. A system, upon detection of requests that are similar to other historical requests, can thus allow the incoming request to proceed. If, however, an incoming request results in the generation of a low normalcy score, the system can determine that the incoming request is potentially anomalous and take one or more actions to prevent the application from executing on a user's computing device. For example, a system can disregard the incoming request, request further information from the originating system to determine whether the requested action should be executed or blocked, or take other actions to prevent execution of the incoming request until receiving an indication that the incoming request is not anomalous activity (e.g., was user-initiated). Further actions may be taken, for example, to correct erroneous determinations that the incoming request corresponds to potentially anomalous requests. The system can request further information from a user of the distributed computing environment to determine whether the incoming request should be executed or not. If an incoming request flagged as a potentially anomalous request is, in fact, not anomalous, the system can retrain the autoencoder to reconstruct events with attributes similar to the incoming request so that similar events are not flagged as potentially anomalous in the future.

FIG. 1 illustrates an example computing environment 100 in which an autoencoder is trained using historical activity data and deployed to a request gateway to determine whether requests to perform an action within the computing environment 100 are potentially anomalous events and process the requests based on the determination of whether the requests are potentially anomalous events. As illustrated, computing environment 100 includes a request gateway 110, an autoencoder trainer 120, an activity log data store 130, and one or more computing resources 140.

Request gateway 110 generally serves as a publicly-facing system through which users request the performance of various actions within the computing environment 100 (e.g., through the execution of one or more functions on computing resources 140). Generally, request gateway 110 receives requests from users of computing environment 100 or from a historical data log of activity within computing environment 100, calculates an normalcy score for each request based on an autoencoder that attempts to reconstruct the request from an encoding of the request, and uses the calculated normalcy score to determine whether an request is potentially anomalous and take action to handle the request based on the determination of whether a request is potentially anomalous. As illustrated, request gateway 110 includes a request processor 112 and a request anomaly detector 114.

Request processor 112 generally receives incoming requests from client devices that instruct computing environment 100 to perform one or more actions with respect to computing resources 140. As discussed, request processor 112 may provide information about the incoming request (e.g., event attributes defining the properties of the requested event (also referred to herein as "request attributes") and contextual attributes defining information about the user that generated the request) to request anomaly detector 114 to obtain a normalcy score. When request processor 112 receives the normalcy score from request anomaly detector 114, request processor 112 can examine the normalcy score to determine whether the incoming request represents a potentially anomalous request for the user. In some embodiments, a normalcy score close to 1 may indicate that the incoming request is similar to non-anomalous requests used to train an autoencoder and thus indicate that the incoming request is likely to correspond to non-anomalous activity. Conversely, a normalcy score close to 0 may indicate that the incoming request is not similar to any of the non-anomalous requests used to train the autoencoder and thus indicate that the incoming request potentially corresponds to anomalous activity within computing environment 100.

If request processor 112 determines that the incoming request is a non-anomalous request, request processor 112 can execute the action(s) identified in the incoming request against the computing resources 140 specified in the incoming request. For example, the actions may include authenticating a user, instantiating or terminating cloud computing instances, instantiating or deallocating dynamic storage systems for the user, changing routing information for the user, changing a geographic location at which cloud computing instances are instantiated, and other operations that may be performed to configure and operate cloud computing instances in a dynamically scalable computing environment.

If, however, request processor 112 determines that the incoming request is a potentially anomalous request, request processor 112 can take one or more actions to verify that the request is a legitimate request or determine that the request is, in fact, an anomalous request that should not be executed. In some embodiments, request processor 112 can use information about the user identified in the incoming request to obtain contact information for the user and push, to the user, a request to verify that the incoming request was generated by the user. For example, user information included in the incoming request (e.g., user account information, such as a user name, an account identifier, etc.) may be used to find user contact information, such as a mobile phone number or e-mail address, in a user database. A notification (e.g., in the form of a short message service (SMS) or multimedia message service (MMS) message, an e-mail, a voice call, a push notification through an application installed on a user's computing device, etc.) may be generated to request that a user confirm that the incoming request is legitimate activity. If the user confirms that the incoming request is legitimate activity, request processor 112 can execute the action(s) identified in the incoming request against the computing resources 140 specified in the incoming request or otherwise unblock execution of the action(s) identified in the incoming request. Otherwise, if the user indicates that the incoming request corresponds to illegitimate activity or does not respond to the request, request processor 112 can drop the incoming request such that no action is performed against computing resources 140 in response to receipt of the incoming request.

Generally, request processor 112 may write information about the incoming requests received at request processor 112 to activity log data store 130 for use in re-training the anomaly detection model used by request anomaly detector 114 to determine whether incoming requests are potentially anomalous for a given user. In some embodiments, request processor 112 may write information about non-anomalous events to activity log data store 130 such that information about anomalous events may not be used to train the anomaly detection model. In some embodiments, user feedback about potentially anomalous events may be used to augment the historical user activity data stored in activity log data store 130 to improve the accuracy at which an anomaly detection model executed by request anomaly detector 114 determines whether incoming requests correspond to anomalous or non-anomalous activity. For example, if a user indicates that an incoming request flagged as potentially anomalous is, in fact, non-anomalous, information about the incoming request may be tagged with an indication that the incoming request corresponds to legitimate activity for the user. When the anomaly detection model is re-trained (which may occur on-demand or periodically), the anomaly detection model may take into account activity marked as legitimate to generate one or more rules for identifying similar activity as non-anomalous activity in the future.

Generally, some amount of anomalous events may be expected to occur for each user of computing resources 140 in computing environment 100 during typical operations within the computing environment 100. However, a spike or other abnormality in the number of anomalous events detected for a given user within a given time period may be indicative of illegitimate activity being generated by a user of computing environment 100 (e.g., due to compromised credentials allowing other persons to impersonate a user, malware programmed to hijack a user's cloud computing instances, etc.). To determine whether the rate at which anomalous activity is generated for a user is within an expected amount for a given window of time, request processor 112 may maintain a counter that tracks a number of potentially anomalous events generated by each user of the computing environment 100 over the window of time. If the counter tracking events flagged as potentially anomalous by request anomaly detector 114 exceeds a threshold number of events over a time window, request processor 112 may take one or more actions to verify that the user has not been compromised and, if so, take one or more actions to rectify any compromise of user credentials or otherwise attempt to reduce the occurrence of potentially anomalous activity generated by the user.

Request anomaly detector 114 generally is configured to calculate a normalcy score for each request to be analyzed using an autoencoder 122 trained by autoencoder trainer 120 using historical user activity from activity log data store 130, as discussed in further detail below. The normalcy score calculated for each request may, in some embodiments, be a conditional probability calculated based on a distance between a reconstructed version of the request to be analyzed and the request to be analyzed, and the normalcy score may represent a likelihood that the request to be analyzed falls is similar to the non-anomalous requests used to train an autoencoder.

As illustrated, request anomaly detector 114 includes an encoder 116 and a decoder 118. Encoder 116 and decoder 118 may be components of an autoencoder, such as a variational autoencoder or a Wasserstein autoencoder, that generates reconstructions of an input by encoding the input into a code in a latent space and decoding the code into the reconstruction of the input. In some embodiments, the autoencoder may be configured to recognize small variations of an a priori known request as a non-anomalous request (e.g., a request having a probability of being in the training data set of non-anomalous requests close to 1), while larger differences between an incoming request and the a priori known requests used to train the autoencoder may be recognized as potentially anomalous requests (e.g., a request having a probability of being in the training data set of non-anomalous requests close to 0).

To calculate an anomaly score for an incoming request, anomaly detector 114 generally receives information about a request from a request processor 112 or from historical requests stored in activity log data store 130. Each request may be defined as a set of event attributes and a set of contextual attributes. The set of event attributes may include, for example, information about the requested action, parameters for the requested action, the source system from which the request was received, and the like. In some embodiments, the information about the source system from which the request was received may include an Autonomous System Number (ASN) of the network from which the request was received. Because IP addresses may change over time, and because IP addresses may have large cardinality (e.g., $2^{32}$ addresses in IPv4, $2^{128}$ addresses in IPv6), using a smaller universe of data such as ASNs, which have a maximum of 65,536 numbers in existence, may provide sufficient information about the source system from which the request was received while reducing the complexity of encoding the incoming request into a latent space representation and generating a reconstruction of the incoming request from the encoding in the latent space. The contextual attributes may include, for example, information about the request itself, such as information identifying the user that generated the request, an account associated with the user, timestamp data, and the like. Information identifying the contextual attributes to use in determining whether an event is anomalous or non-anomalous may be defined by a user according to contextual information found to have been relevant to determining whether evets correspond to anomalous or non-anomalous activity.

In some embodiments, the contextual information may be encoded into a compressed representation of the context information prior to encoding the incoming request into an encoding in the latent space of an autoencoder. The contextual information may be encoded using a neural network configured to compress a number of pieces of contextual information into an encoding representing the contextual information of the request. In some embodiments, the individual pieces of contextual information may be combined into a contextual information vector, and the contextual information vector may be encoded using a neural network. Request anomaly detector 114 may then generate a request vector representing the incoming request including information about the event to be invoked, the contextual information vector, and an identification of the system from which the incoming request was received.

Encoder 116 generally maps the incoming request to an encoding in a latent space based on the request vector and a neural network trained to compress an incoming request into a code representing the incoming request. Generally, encoder 116 processes the request vector representing the incoming request using one or more neural network layers and a bottleneck layer to select a code in a latent space representing the incoming request. In some embodiments, the one or more neural network layers may be a plurality of rectified linear units (ReLUs) that compress a request vector into a more compact representation. The bottleneck layer may use information about the parameters of a probability distribution, such as the mean and standard deviation of a probability distribution generated over the training data set for the incoming request, as bottleneck dimensions to encode the compressed representation of request vector x representing the incoming request generated by the one or more neural network layers into a code z in the latent space of an autoencoder. Encoder 116 may then output the code z in the latent space to a decoder 118 for further processing.

Decoder 118 generally receives a code z from encoder 116 and attempts to generate a reconstruction x' of the request attributes of the incoming request, given the contextual attributes (e.g., user name, account identification, user type, etc.) as context for the request. Decoder 118 may be structured as a plurality of neural networks configured to generate the approximation x' of the incoming request for each request attribute. These neural networks may include, for example, a plurality of neural network layers, such as ReLUs, that expand a code z into a larger mapping, and the output of the neural network may be processed through a probability output layer, such as a softmax layer, that generates a probability distribution that a reconstruction of the request attributes exists within a universe of known non-anomalous requests. Generally, the probability distribution for a reconstruction x' of a feature of a request x may have at least one value with a sufficiently high probability value if the request x is similar to requests that are known to be non-anomalous, while the probability distribution for the reconstruction x' may not have any values with a sufficiently high probability value if the request x is not similar to requests that are known to be non-anomalous. In some embodiments, decoder 118 can output a normalcy score as the highest probability value in the probability distribution generated by the normalizing function, and the normalcy score can be used by request processor 112 to determine whether to allow or disallow execution of a request, as discussed above.

While encoder 116 and decoder 118 are illustrated in FIG. 1 as executing on the same computing system, it should be recognized that encoder 116 and decoder 118 may be jointly trained but deployed on different systems. For example, encoder 116 may execute on a first server in a distributed computing environment, and decoder 118 may execute on a second server in the distributed computing environment. In another example, encoder 116 may be deployed to a system from which requests to perform actions within computing environment 100 are received, and decoder 118 may be deployed to a request gateway that manages execution of incoming requests. In still another example, encoder 116 and decoder 118 may both execute on the system from which requests to perform actions within computing environment 100 are received and can be configured to block transmission of requests that are identified as potentially anomalous so that such requests are not received at request gateway 110.

In some embodiments, other anomaly detection techniques can be used as an alternative to or in conjunction with the autoencoder-based anomaly detection techniques discussed herein. For example, conditional noise contrastive estimation (NCE) models trained on a training data set of non-anomalous requests can be used to generate anomaly scores for each incoming request. NCE anomaly scores can be used alone or in conjunction with the normalcy scores generated by an autoencoder-based anomaly detector to determine whether an incoming request is potentially anomalous and process the incoming request.

Generative model trainer 120 is generally configured to train the encoder 116 and decoder 118 of the autoencoder 112 used by request anomaly detector 114 to determine whether an incoming request corresponds to anomalous or non-anomalous activity with computing environment 100. Generative model trainer 120 can train the autoencoder 122, for example, as a conditional variational autoencoder, a conditional Wasserstein autoencoder, or any other autoencoder that can reconstruct an approximation x' of an incoming request x and determine a likelihood that the incoming request x is similar to a universe of a priori known non-anomalous requests.

If autoencoder trainer 120 trains an autoencoder as a conditional variational autoencoder, the set of variables may include input context variables c, output variables X, and Gaussian latent variables z. Generative model trainer 120 can train the autoencoder as a set of multilayer perceptrons. The set of multilayer perceptrons may include a recognition network $q_\phi(z|X, c)$, a conditional prior network $p_\theta(z|c)$, and a generation network $p_\theta(X|c,z)$. The model may be trained to maximize a conditional log-likelihood, and various estimation functions, such as a Stochastic Gradient Variational Bayes estimator, can be used for efficient approximation. The model may use a variational lower bound and an empirical lower bound. The variational lower bound of the model may be defined according to the equation:

$$\log p_\theta(X|c) \geq -KL(q_\phi(z|X,c)\|p_\theta(z|c)) + E_{q_\phi(z|X,c)}[\log p_\theta(X|c,z)]$$

and the empirical lower bound may be defined according to the equation:

$$\tilde{L}_{CVAE}(c, X, \theta, \phi) = -KL(q_\phi(z|X,c)\|p_\theta(z|c)) + \frac{1}{L}\sum_{l=1}^{L}\log p_\theta(X|c, z^{(l)})$$

The conditional variational autoencoder may be trained using the loss function:

$$loss = -logloss_{Event} - logloss_{systemID} + KL$$

where $logloss_{Event}$ represents the performance of the autoencoder in reconstructing an event given context variables c, $logloss_{systemID}$ represents the performance of the autoencoder in reconstructing the identification of the system from which a request was received given context variables c, and KL represents the KL distance between two probability distributions.

An autoencoder implemented as a conditional variational autoencoder may use Monte Carlo sampling to draw latent samples z times using the conditional prior network and averages the conditional likelihood to estimate a probability distribution that a reconstructed request X is in a set of likely non-anomalous requests given the input context variables c. In some embodiments, the request attributes (e.g., event type, source system/network from which the request was received) may be independent to each other given the context variables, and the conditional variational autoencoder may generate a probability that a reconstruction of a given event and source system exists in the set of likely non-anomalous requests given the input context variables c for use as a normalcy score, as discussed above.

In some embodiments, autoencoder trainer 120 may be configured to train the autoencoder as a conditional Wasserstein autoencoder, which may eliminate the Monte Carlo sampling used by a conditional variational autoencoder discussed above and seek to minimize an approximated Wasserstein distance between a model distribution and the target distribution. Generative model trainer 120 may be configured to generate an objective function for a Wasserstein autoencoder that includes the reconstruction cost and a regularizer that penalizes a discrepancy between a Gaussian distribution and a learned distribution of encoded points in the latent space of the autoencoder. In some embodiments, deterministic encoders may be trained for use in a Wasserstein autoencoder and may be implemented without incurring overfitting issues that may occur in typical unregularized autoencoders. Because deterministic encoders may be used in a Wasserstein autoencoder, embodiments may instantiate a conditional Wasserstein autoencoder model with deterministic encoder-decoder pairs to minimize a number of times each event is analyzed to generate a normalcy score for a reconstruction of an event.

Activity log data store 130 generally provides a data repository in which historical information about user activity within computing environment may be stored for use in training an anomaly detection model. Activity log data store 130 may be structured, for example, as a relational database, a non-relational database, a flat file store including one or more files in which user activity information is stored, and the like. Generally, data stored in activity log data store 130 may include information about each request processed in the computing environment 100. This information may include event information identifying the activity requested by a user and contextual information providing information about the request. This contextual information may include, for example, information about a location from which the request was generated and time at which the request was generated, username and account information, and other information that may be used in conjunction with the event information to train an anomaly detection model to generate conditional probabilities representing a likelihood that a particular user generated a request to perform a particular action at a given time and from a given location. Generally, activity log data store 130 may be periodically augmented to include information about activity generated by new users and additional activity generated by existing users so that the anomaly detection model may be retrained.

Computing resources 140 generally represent various cloud computing resources that users can execute requests against to obtain or release computing resources for use in performing a given task. These computing resources may include, for example, dynamically allocable virtual machines or other cloud computing instances, cold storage instances for storing data in a persistent manner, database services used by other cloud computing instances in computing environment 100, machine learning system instances, request routers, load balancers, and other computing resources that may be dynamically assigned to serve various users within the cloud computing environment. Generally, request processor 114 may execute requests against the computing resources 140 if, as discussed above, the requests are determined to correspond to non-anomalous activity or if a user indicates that potentially anomalous activity corresponds to legitimate, non-anomalous activity.

In some embodiments, the techniques described above may be used to monitor for potentially fraudulent activity by users of computing environment 100. To determine whether a user is engaged in potentially fraudulent activity within computing environment 100, request anomaly detector 114 may receive a data set of historical requests generated by the user over a period of time. The data set may include a plurality of requests to perform actions within computing environment 100, and information about each request may specify the requested action, the source device that generated the request to perform the requested action, and contextual information about each request (e.g., user ID information, account information user type information, and the like).

Request anomaly detector 114 may generate normalcy scores for each request in the plurality of requests and, in some embodiments, may calculate a distribution of the generated anomaly scores to determine whether the user is potentially engaged in fraudulent activity within computing environment 100. For example, in calculating a distribution of the generated normalcy scores, request anomaly detector 112 can generate a histogram showing the frequency at which ranges of normalcy scores are calculated for requests in the data set. In some embodiments, it may be assumed that a user that is not potentially engaged in fraudulent activity may be associated predominantly with requests having high normalcy scores (e.g., requests that are likely to represent expected action for the user within the computing environment 100), while a user that is potentially engaged in fraudulent activity may have a bimodal distribution of probability scores (e.g., a large number of requests having low normalcy scores and a large number of requests having high normalcy scores), or a distribution skewed towards requests having low normalcy scores. In another example, request anomaly detector can identify the number of requests in the data set having normalcy scores less than a threshold score defined for potentially anomalous events. If the number of potentially anomalous events exceeds a threshold value (e.g., an absolute number of potentially anomalous events or a percentage of the requests associated with the user for a given time period), request anomaly detector can determine that the user is potentially engaged in fraudulent activity.

When request anomaly detector 114 determines that a user is potentially engaged in fraudulent activity, request anomaly detector 114 can take various actions to prevent the user from generating additional activity within computing environment 100. For example, login credentials for the user may be changed to prevent the user from logging into computing environment 100 using previously valid login credentials or authenticating requests to perform actions in computing environment 100 at request gateway 110. In another example, request gateway 110 may be configured to drop received requests associated with the user or queue such requests for execution after user confirmation that the requests are legitimate requests to perform actions within computing environment 100 (e.g., were not generated by someone pretending to be the user).

Figure 2:
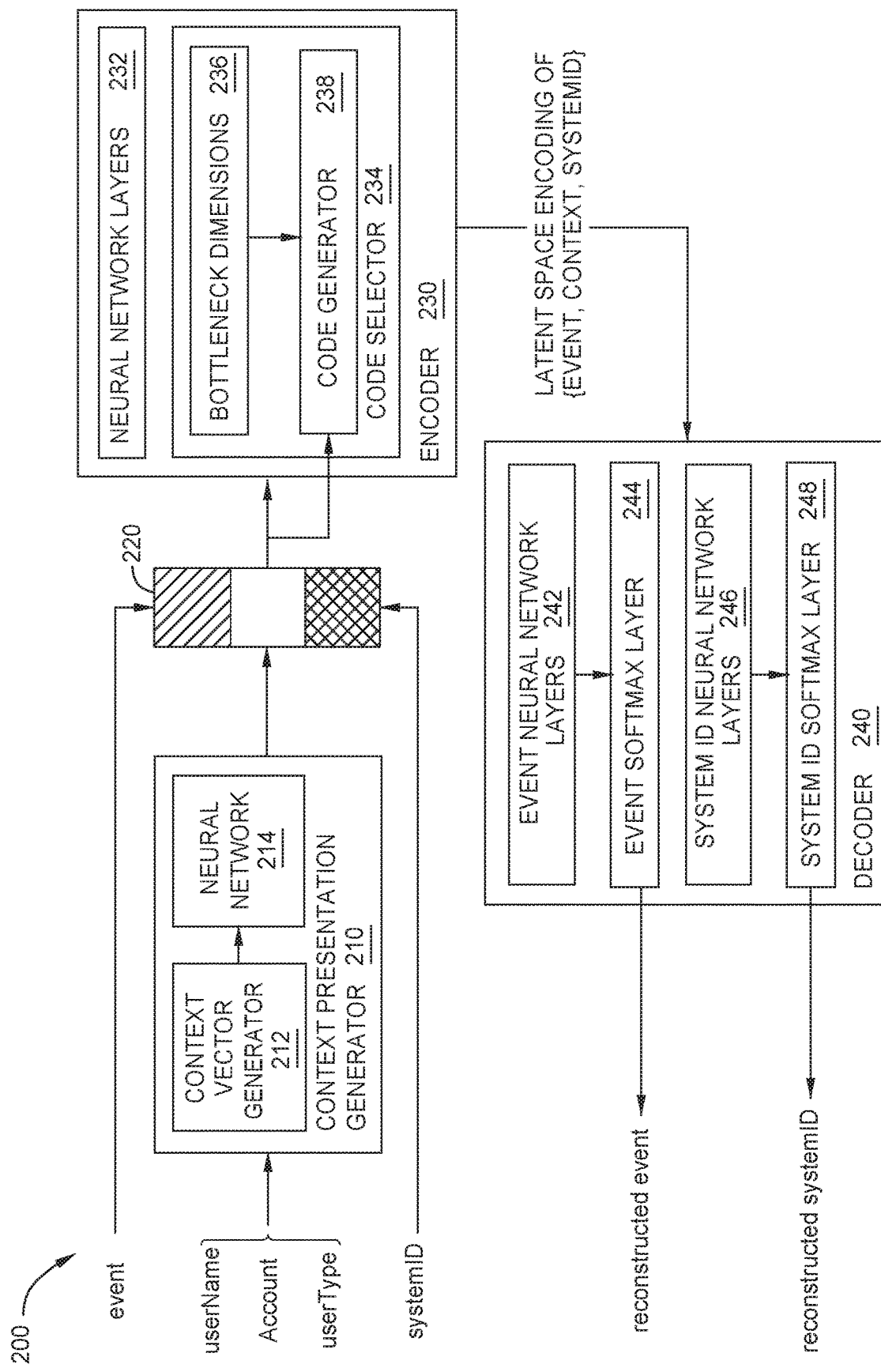
FIG. 2 illustrates an example autoencoder pipeline in which an incoming request is encoded into a latent space and decoded into a reconstruction of one or more attributes of the incoming request used to determine whether the incoming event is potentially anomalous, according to one embodiment.

FIG. 2 illustrates an example autoencoder architecture of a model used to reconstruct an approximation x' of a request x from an encoding z and determine, based on a normalcy score calculated for the reconstruction x' of the request x, whether a request corresponds to non-anomalous activity or potentially anomalous activity within a computing environment 100. The autoencoder architecture 200 may represent one embodiment of an autoencoder 122 trained by the autoencoder trainer 120 and executed within request anomaly detector 114 illustrated in FIG. 1. As illustrated, autoencoder architecture 200 includes a context representation generator 210, a vector 220, an encoder 230, and a decoder 240.

Context representation generator 210 generally receives the contextual attributes of a request to invoke an action within computing environment 100 and generates a reduced size representation of the contextual information which can be used by encoder 230 to encode a request to perform an action within computing environment 100 into a code z. As illustrated, context representation generator 210 may include a context vector generator 212 and a neural network 214. Context vector generator 212 generally organizes the contextual information included in a request x to invoke an action within computing environment 100 into a vector of contextual information that can be reduced into an encoded representation of the contextual information. The vector may be generated as a set of contextual attributes that are included in the request and exclude the request attributes included in the request x, such as the information about the event or action to be invoked by the request x and the source system that generated the request x, as the contextual information may be used to encode and reconstruct the request attributes, as discussed above. For example, the context vector may include the userName, Account, and userType attributes illustrated in FIG. 2, and these attributes may be used to reconstruct the event and systemID attributes at decoder 240, as discussed in further detail below.

Neural network 214 may include a plurality of fully or partially connected layers configured to map a context vector to an encoding of the context vector. The encoding of the context vector may be a reduced-size representation of the contextual attributes included in the request x. In some embodiments, neural network 214 may include a plurality of ReLU layers configured to reduce the context vector into the reduced-size representation of the contextual attributes.

After the contextual attributes included in request x have been processed by context representation generator 210 into a reduced-size representation, autoencoder architecture 200 can generate a request vector 220 representing the request x that is used by encoder 230 to encode the request x into a latent space encoding z. The request vector 220 may include information about the event invoked by the request x, the reduced-size representation of the contextual attributes generated by context representation generator 210, and the identification of the system that generated the request x. As discussed, the identification of the request may be transformed from an IP address, which generally has high cardinality and can change periodically, to a more stable, smaller data space such as an Autonomous System Number that identifies the network from which the request was received.

Encoder 230 generally receives the request vector 220 representing request x and generates a latent space encoding z of the request that may be used by decoder 240 to reconstruct an approximation of the request attributes of the request x and determine whether the request corresponds to non-anomalous or potentially anomalous activity within computing environment 100. Generally, the request vector may be processed through the neural network layers 232 to compress the request vector 220 into a reduced-size representation. The output of the neural network layers 232 may be input into code selector 234, which uses parameters of a probability distribution, such as mean and standard deviation information, in bottleneck dimensions 236 to further compress the request vector 220. The bottleneck dimensions 236 and context vector 220 may be combined in code generator 236 to ultimately map the request vector representing request x to a code z in the latent space. Generally, code z may be a compressed, latent space encoding of the set of data including {event information, representation of contextual attributes, source system/network information}. Encoder 230 generally outputs code z for further processing by a decoder 240, as discussed in further detail below.

Decoder 240 generally is configured to reconstruct an approximation x' of the request x from a code z in the latent space generated by encoder 230, as discussed above. As illustrated, decoder 240 may include event neural network layers 242 and event softmax layer 244, which may be used to reconstruct the event identified in the incoming request x, and system ID neural network layers 246 and system ID softmax layer 248, which may be used to reconstruct the system ID identified in the incoming request x.

Event neural network layers 242 generally expand the latent space encoding of the request x from code z to a reconstruction of the event included in the request x. The expanded set of data generated by event neural network layers 242 may be processed through event softmax layer 244, which calculates a probability distribution for the reconstructed event over the universe of events used to train the autoencoder, given the attributes of username, Account, and userType as context. Based on the calculated probability distribution, decoder 240 can identify the most likely reconstructed event (e.g., the reconstructed event associated with the highest probability in the probability distribution) and output the reconstructed event and probability associated with the reconstructed event as the normalcy score for the event. Similarly, system ID neural network layers 246 generally expand the latent space encoding of the request x from code z to a reconstruction of the system identifier (e.g., the ASN of the network from which the request was received) included in the request x. System ID softmax layer 248 can use the expanded data set generated by system ID neural network layers 246 to calculate a probability distribution for the reconstructed system ID over the universe of events used to train the autoencoder, given the attributes of username, Account, and userType as context. Decoder 240 can output the reconstructed system ID associated with the highest probability and the probability associated with the reconstructed system ID as the normalcy score for the system ID. in some embodiments, the normalcy score for the reconstructed event and reconstructed systemID can be combined to arrive at a joint probability that the reconstructed event and system ID exist in the set of non-anomalous requests, and the joint probability may be deemed the normalcy score used to determine whether the request corresponds to anomalous activity and to process the request accordingly, as discussed above.

Figure 3:
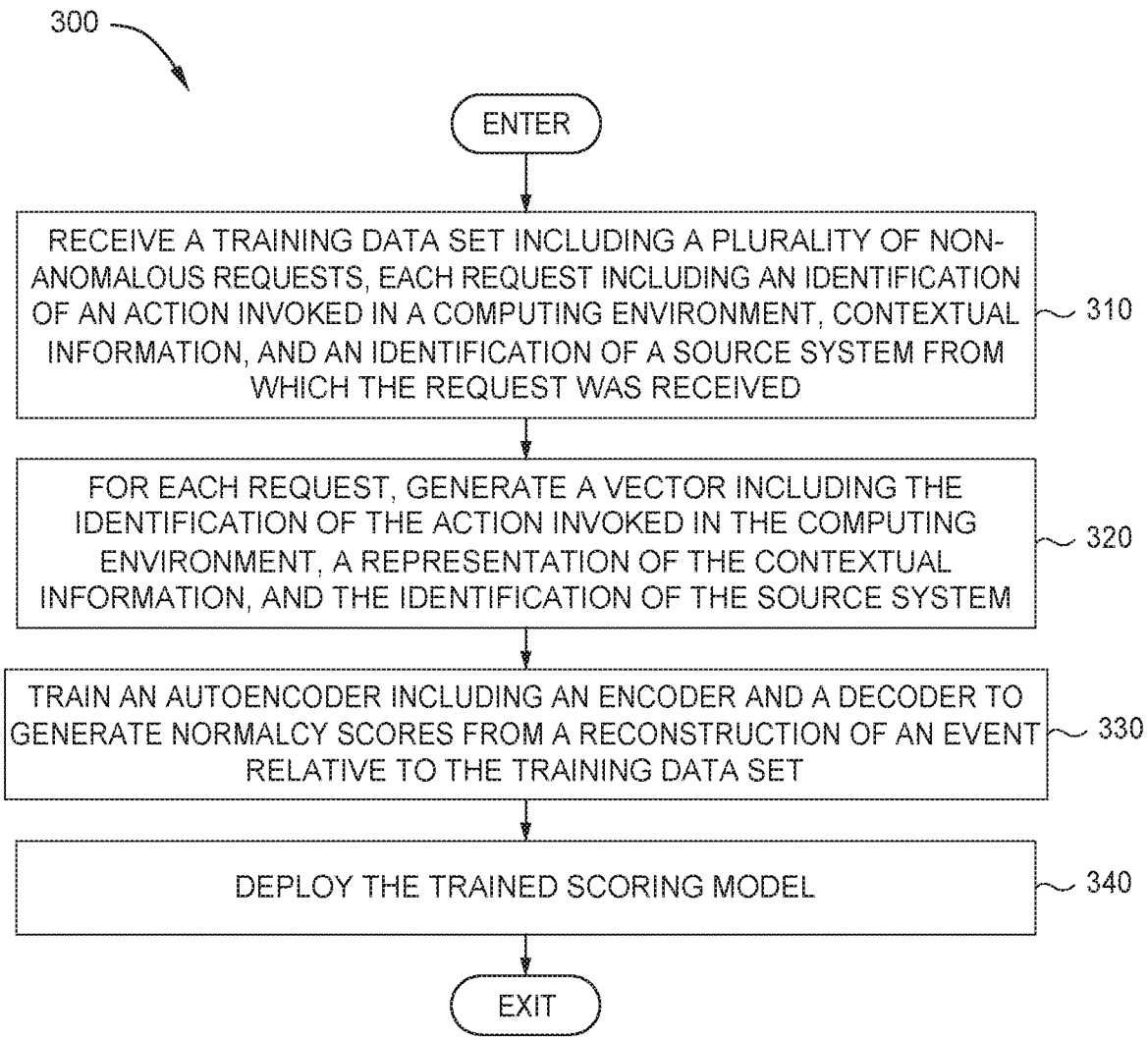
FIG. 3 illustrates example operations for training an autoencoder for reconstructing an approximation of an incoming request used to determine whether the incoming request corresponds to potentially anomalous actions within a distributed computing environment, according to one embodiment.

FIG. 3 illustrates example operations that may be performed by a model trainer (e.g., autoencoder trainer 120 illustrated in FIG. 1) for training and deploying an autoencoder that generates normalcy scores based on reconstructions x' of a request x from a latent space encoding z of the request, according to an embodiment.

As illustrated, operations 300 begin at block 310, where a system receives training data for a plurality of users of a distributed computing environment. The training data generally includes information about a plurality of requests to invoke various operations within the distributed computing environment. The requests may each include categorical data that the model trainer can use, individually and in combination, to train a model to estimate conditional probabilities for each attribute of a request. For example, the information may include attributes of each request, such as an API call invoked by a request, a computing resource targeted by the API call, the system or network that generated the request and the like, as well as contextual information about requests received in computing environment 100, such as user identification, user type information, account information (e.g., an account identifier), and other information that may provide context about requests generated by users of a computing environment 100.

At block 320, the system generates a vector for each request in the training data. The vector generally includes the identification of the action invoked in the computing environment through the request, a representation of the contextual information, and the identification of the source system. As discussed, the system can generate the representation of the contextual information using a neural network trained to encode a vector of contextual information into a reduced-size representation of the contextual information included in each request. The contextual information may include, for example, a user ID, an account type, a user type, and other information about the user invoking the request to perform an action within the computing environment.

At block 330, the system trains an autoencoder using the training data to generate an autoencoder for reconstructing requests and using the reconstruction to determine whether received requests correspond to probable anomalous activity for a user of the distributed computing system. As discussed, the autoencoder may be implemented as various types of autoencoders that are configured to encode a received request into a smaller code in a latent space of the autoencoder, reconstruct an approximation x' of the received request x from the code z to which the receive request is encoded, and output a probability distribution indicating a likelihood that the reconstructed approximation x' is similar to a non-anomalous request included in the training data used to generate the autoencoder. The autoencoder may be trained using various unsupervised learning techniques in which vectors representing each request in the training data are ingested and analyzed to train the neural networks of an encoder to map requests to codes in a latent space and to train the neural networks of a decoder to extract an approximation from each code in the latent space.

At block 340, the system deploys the trained autoencoder. In some embodiments, the trained autoencoder may be deployed to a request gateway for use in identifying probable anomalous requests received at the request gateway. In some embodiments, the trained autoencoder may be deployed to an application server for use in identifying anomalous activity from historical data logs and taking action based on the data in the historical data logs to prevent future occurrences of anomalous activity (e.g., by deauthorizing potentially compromised authentication credentials, blocking activity from anomalous network locations, and the like).

Figure 4:
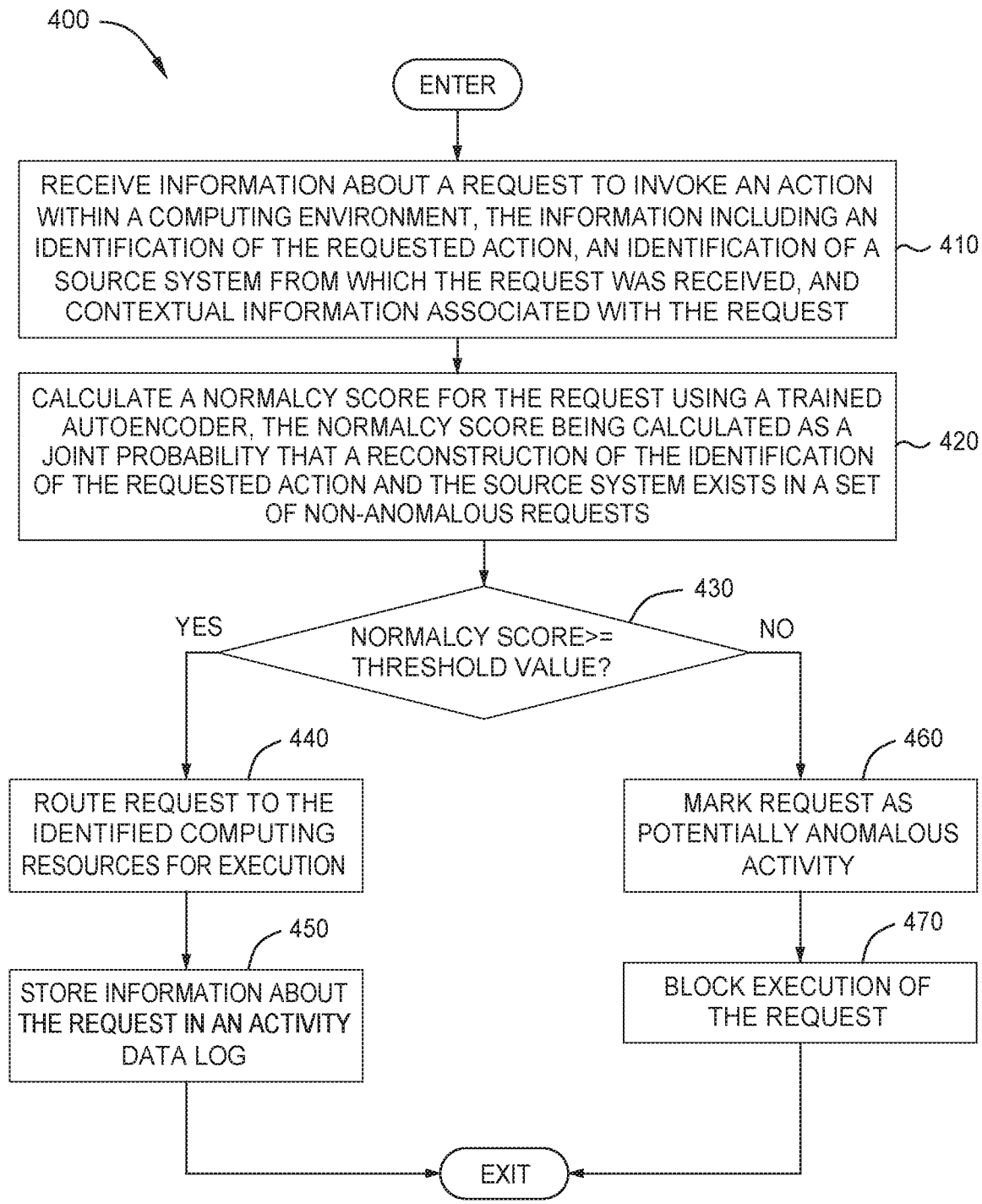
FIG. 4 illustrates example operations for determining whether requests to perform an action within a distributed computing environment are potentially anomalous based on a normalcy score calculated for a reconstruction of one or more attributes of an incoming request generated by a trained autoencoder and processing the incoming request based on the calculated normalcy score, according to one embodiment.

FIG. 4 illustrates example operations 400 that may be performed to determine whether requests to perform actions within a computing environment correspond to anomalous or non-anomalous activity based on a reconstructions of requests and normalcy scores generated by an autoencoder, according to an embodiment.

As illustrated, operations 400 begin at block 410, where a system receives, from a user of resources in a distributed computing environment, a request to perform an action with respect to one or more identified computing resources in the distributed computing environment. Generally, each request may include a plurality of request attributes and a plurality of contextual attributes. The request attributes may include at least information identifying the action to be performed and an identification of the source system (or network) from which the request was received. Other request attributes that may be included in a request may include, without limitation, an identification of the target computing resources against which the request is to be performed (e.g., a cluster of computing resources located at a particular geographic location), and other information defining an action to be performed against the target computing resources. For example, in a request to spawn a cloud computing instance, the request may include information identifying the cluster in which the cloud computing resources are to be generated, the amount of computing resources to allocate to the cloud computing instance (e.g., a number of processors, amount of memory, network interfaces, virtualizeable I/O devices, etc.), and the like. The request may further include, explicitly or implicitly, contextual information that may be used by a scoring model to determine whether a request corresponds to non-anomalous (legitimate) activity or potentially anomalous activity. This contextual attributes may include, without limitation, information about the user initiating the request, account privileges, user type information, a location from which the request was received, a timestamp indicating when the request was received, and additional contextual information that may be predictive of whether a received request corresponds to anomalous or non-anomalous activity.

At block 420 the system generates a normalcy score for the request using a trained autoencoder. The normalcy score may be calculated as a joint probability that a reconstruction of the request attributes generated by an autoencoder exists within a universe of non-anomalous activity in view of the contextual information included in the request. To generate the normalcy score for the request, the system can generate a vector representing the request by first generating a reduced-size representation of the contextual information associated with the request using a first neural network. The reduced-size representation of the contextual information may be an encoding of the contextual information in a latent space from which the contextual information can be reconstructed. The vector representing the request may be created to include the request attributes (e.g., requested action or event, source system generating the request, etc.) and the representation of the contextual information. The vector representing the request may be encoded into a code in a latent space using an encoder portion of the autoencoder, and the code may be decoded in a decoder portion of the autoencoder to extract an approximate reconstruction of the request attributes and a normalcy score associated with the approximate reconstruction of the request attributes. Generally, the autoencoder may be trained to generate a relatively accurate reconstruction of the request attributes (e.g., a reconstruction of the request attributes that differs from the request attributes included in the incoming request by less than a threshold amount) if the incoming request is similar to non-anomalous requests used to train the autoencoder such that a normalcy score associated with the approximate reconstruction of the request attributes indicates a high probability (e.g., close to 1) that the request is in the class of non-anomalous requests with respect to the context of the request. In contrast, the autoencoder may be trained to generate an inaccurate reconstruction of the request attributes if the incoming request is not similar to the non-anomalous requests used to train the autoencoder such that a normalcy score associated with the approximate reconstruction of the request indicates a low probability (e.g., close to 0) that the request is in the class of non-anomalous requests with respect to the context of the request.

At block 430, the system determines whether the normalcy score exceeds or is equal to a threshold value. The threshold value may be defined as a minimum probability that the request attributes exist within the class of non-anomalous requests and may be calculated as a joint probability that the request attributes exist in the class of non-anomalous requests, given the contextual attributes included in the incoming request.

If, at block 430, the system determines that the normalcy score exceeds or is equal to the threshold value, the system can determine that the request corresponds to non-anomalous activity. Operations 400 may proceed to block 440, where the system routes the received request to the identified computing resources for execution. At block 450, the system stores information about the request in an activity data log.

If, however, at block 430, the system determines that the normalcy score calculated for the received request is below the threshold value, the system can determine that the request corresponds to potentially anomalous activity within the computing system. Operations 400 may thus proceed to block 460, where the system marks the request as potentially anomalous activity. At block 470, the system may block execution of the request.

In some embodiments, the system may request user confirmation of the requested action. To request user confirmation of the requested action, the system can use user information embedded in the request or included in contextual information about the request to query a user database for contact information for the user. The contact information may include, for example, a mobile phone number, a landline phone number, an e-mail address, or other information identifying how a user may be contacted to verify whether activity flagged as potentially anomalous corresponds to legitimate or illegitimate activity for the user. To request confirmation that the user initiated the activity, the system may, for example, send a text message, initiate a telephone call, send an e-mail message, push a notification to a mobile phone or other computing device associated with the user, or take other action based on the contact information provided by a user to the computing environment. If the user confirms that the request corresponds to legitimate activity, the system can re-designate the request as legitimate activity in the activity data log, and the activity data log may be used to re-train the autoencoder.

Figure 5:
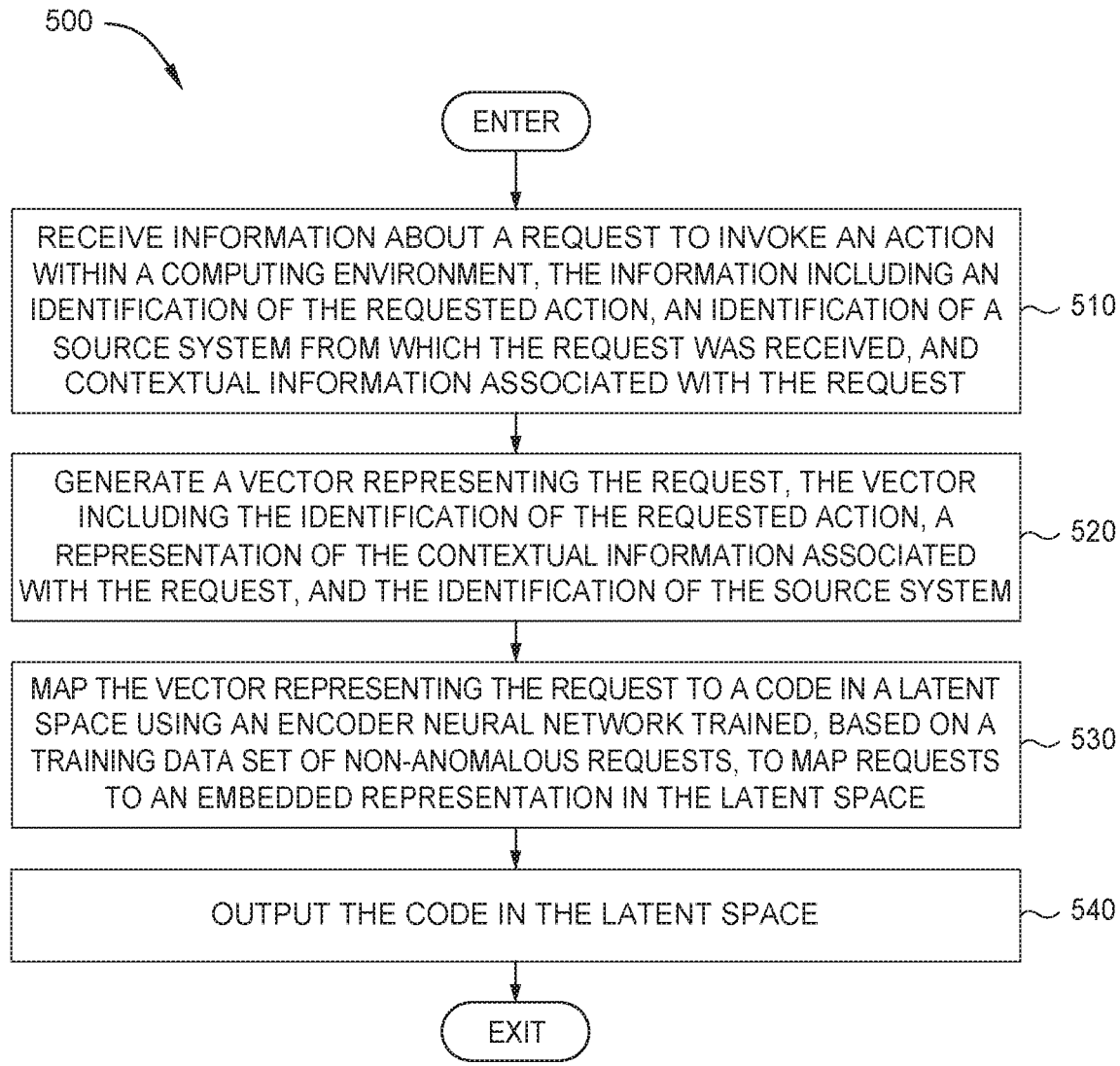
FIG. 5 illustrates example operations for encoding an incoming request to a code in a latent space of an autoencoder, according to one embodiment.

FIG. 5 illustrates example operations 500 for encoding a request to perform an action within a computing environment into a code in a latent space of an autoencoder, according to one embodiment. Operations 500 may be performed, for example, by an encoder portion of an autoencoder trained to encode requests into a latent space based on a training data set of non-anomalous requests.

As illustrated, operations 500 begin at block 510, where an encoder receives information about a request to invoke an action within a computing environment. As discussed, the information may include request attributes, such as an identification of the requested action, an identification of a source system from which the request was received, and the like, and contextual information associated with the request.

At block 520, the system generates a vector representing the request. The vector generally includes the identification of the requested action, a representation of the contextual information associated with the request, and the identification of the source system. As discussed, the representation of the contextual information may be generated using a first neural network configured to compress the contextual information into a reduced-size representation of the contextual information associated with the request.

At block 530, the system maps the vector representing the request to a code in a latent space. Generally, the code in the latent space may be a compressed representation of the request that a decoder component of an autoencoder can use to reconstruct an approximation of the request and determine a normalcy score for the request. The mapping may be performed using an encoder neural network trained, based on a training data set of non-anomalous requests, to map requests to an embedding representation in the latent space of an autoencoder. As discussed, the autoencoder may be, for example, a conditional variational autoencoder trained to minimize a KL distance between target and generated distributions, a Wasserstein autoencoder trained to minimize a Wasserstein distance between target and generated distributions, or other autoencoders that can be used to reconstruct an approximation of a request from an encoding of the request in the latent space of the autoencoder.

At block 540, the system outputs the code in the latent space for further processing. In some embodiments, the code may be output directly to a decoder component of an autoencoder. In other embodiments, the code may be output to persistent or temporary memory for future analysis and/or transmission to the decoder component of the autoencoder.

Figure 6:
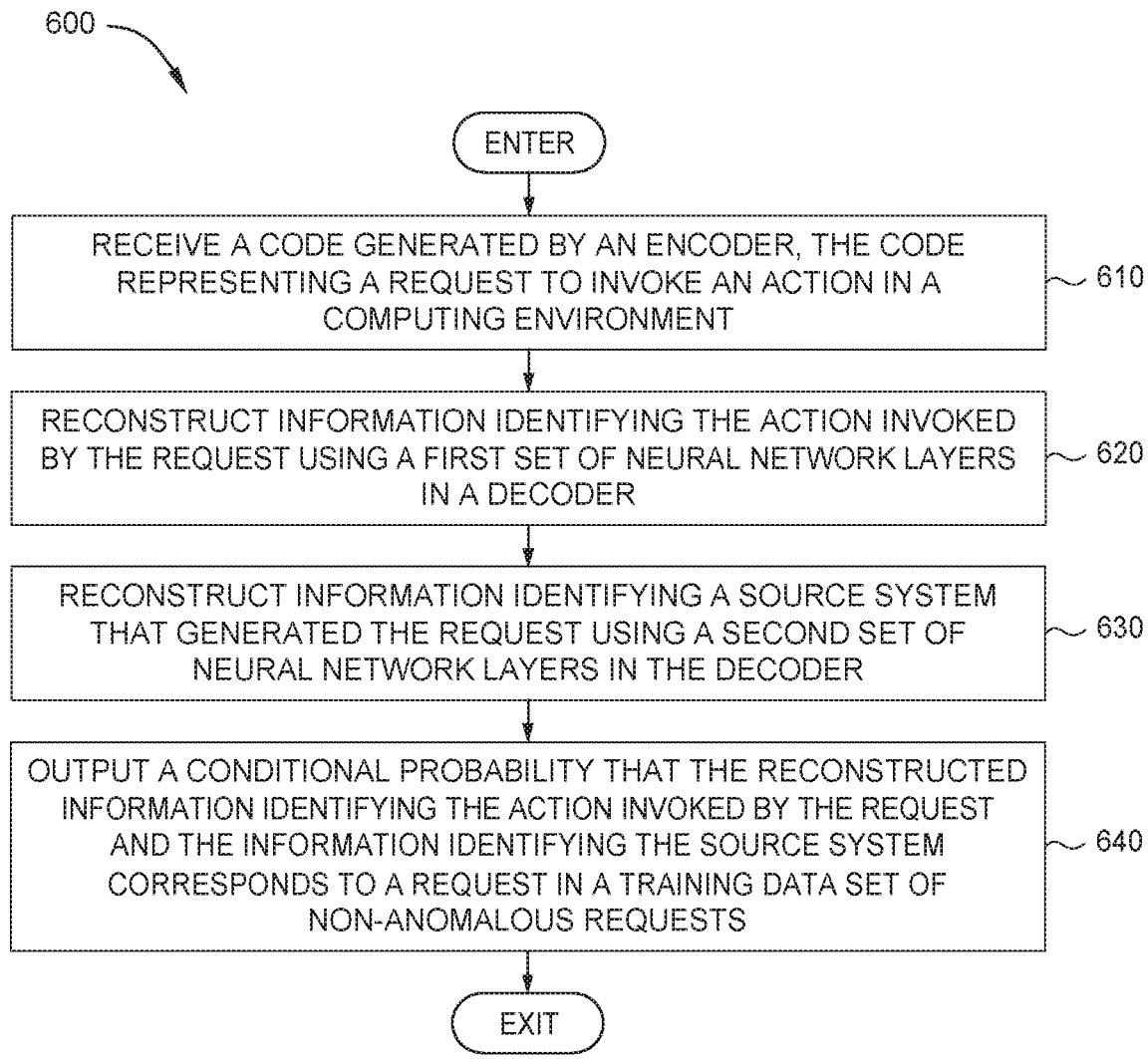
FIG. 6 illustrates example operations for reconstructing an approximation of an incoming request from an code in a latent space of an autoencoder, according to one embodiment.

FIG. 6 illustrates example operations 600 for reconstructing an approximation of a request from an encoding of the request and using the reconstructed request to determine whether a request corresponds to potentially anomalous activity within a computing system, according to an embodiment.

As illustrated, operations 600 begin at block 610, where a system receives a code generated by an encoder. The code generally is a compressed representation of a request to invoke an action in a computing environment, as discussed above.

At block 620, the system reconstructs information identifying the action invoked by the request using a first set of neural network layers in a decoder. Generally, the reconstruction of the information identifying the action invoked by the request may include expanding the code representing the request from the compressed representation of the request, given the contextual information included in the request. In some embodiments, reconstructing the information identifying the action invoked by the request may include generating a probability distribution over the actions included in a training data set of non-anomalous activity. The probability distribution generally represents a probability that the reconstructed information identifying the action is similar to each action included in the training data set, given the contextual information included in the request as context.

At block 630, the system reconstructs information identifying the source system that generated the request using a second set of neural network layers in a decoder. Generally, the reconstruction of the information identifying the source system that generated the request may include expanding the code representing the request from the compressed representation of the request, given the contextual information included in the request. In some embodiments, reconstructing the information identifying the source system that generated the request may include generating a probability distribution over the source systems included in a training data set of non-anomalous activity. The probability distribution generally represents a probability that the reconstructed information identifying source system is similar to each source system from which a request included in the training data set was received, given the contextual information included in the request as context.

At block 640, the system outputs a conditional probability that the reconstructed information identifying the action invoked by the request and the information identifying the source system corresponds to a request in a training data set of non-anomalous requests. Generally, a conditional probability that the reconstructed information about the action and the source system corresponds to a request in the training data set may be close to 1 if the request is similar to the non-anomalous requests in the training data set and may be close to 0 if the request is different from the non-anomalous requests in the training data set. As discussed, the conditional probability output by the system may be used as a normalcy score that can be used to determine whether to allow or disallow execution of an incoming request, flag historical requests as potentially anomalous, and the like.

Figure 7:
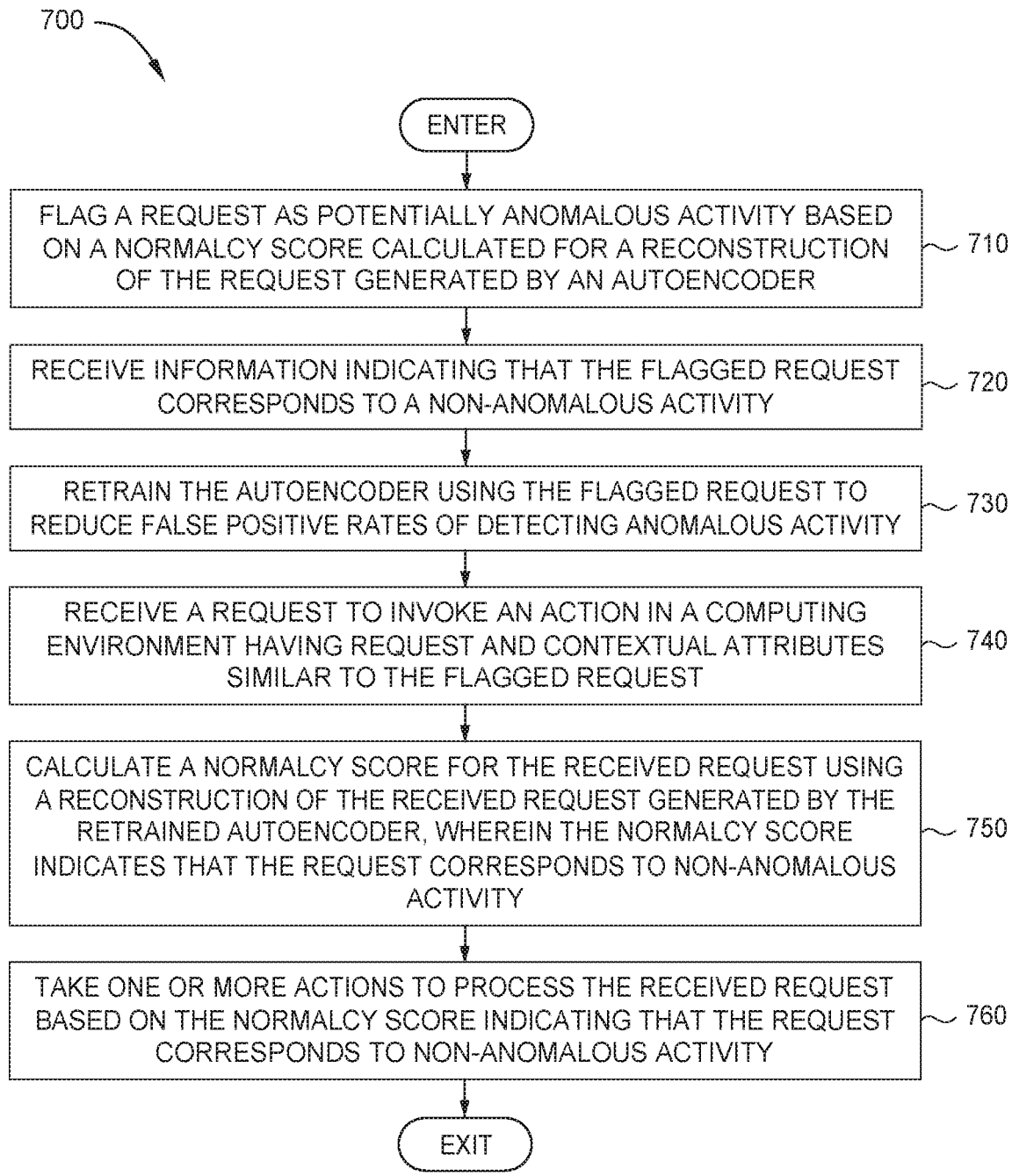
FIG. 7 illustrates example operations for retraining an autoencoder based on user identification of potentially anomalous requests as non-anomalous activity and generating normalcy scores for subsequent requests having similar attributes to requests identified as non-anomalous activity, according to one embodiment.

FIG. 7 illustrates example operations 700 for retraining a scoring model based on user identification of potentially anomalous requests as anomalous or non-anomalous activity, according to an embodiment. As illustrated, operations 700 begin at block 710, where the system flags a request as potentially anomalous activity. As discussed, the system can flag the request as potentially anomalous activity based on a normalcy score calculated for a reconstruction of the request generated by an autoencoder (e.g., a conditional variational autoencoder or a conditional Wasserstein autoencoder). Generally, where the normalcy score calculated for the reconstruction of the request is below a threshold probability value, the request may be flagged as potentially anomalous.

At block 720, the system receives information indicating that identified sensitive requests correspond to non-anomalous activity.

At block 730, the system retrains the autoencoder using the received information to reduce false positive rates of detecting anomalous activity. To retrain the autoencoder, the system may generate a training data set including the requests previously identified as potentially anomalous activity that have been confirmed to actually correspond to non-anomalous activity. The training data set may be unlabeled data, and the autoencoder may be trained using unsupervised learning techniques so that the autoencoder can learn encodings and decodings of non-anomalous requests (i.e., requests that are expected to be received for a given context).

At block 740, the system receives information about a request having request attributes and conditional attributes similar to one of the identified sensitive requests corresponding to non-anomalous activity. The information about the request may be received in real-time or from a log of historical data.

At block 750, the system generates an normalcy score for the request using the retrained scoring model. The normalcy score, as discussed, may be generated as a joint conditional probability score over each request attribute, given information about the user invoking the request as context. The retrained scoring model may be trained to recognize requests having similar attributes to one of the identified sensitive requests as non-anomalous activity.

At block 760, the system takes one or more actions based on the generated normalcy score indicating that the request corresponds to non-anomalous activity. For example, where an anomaly score for a request is generated in real-time, the system may allow execution of the request against the computing resources identified in the request. In another example, where an anomaly score is generated for a request that has previously been executed in the computing environment 100, the system may omit the request from a report identifying potentially anomalous activity within computing environment 100.

Figure 8:
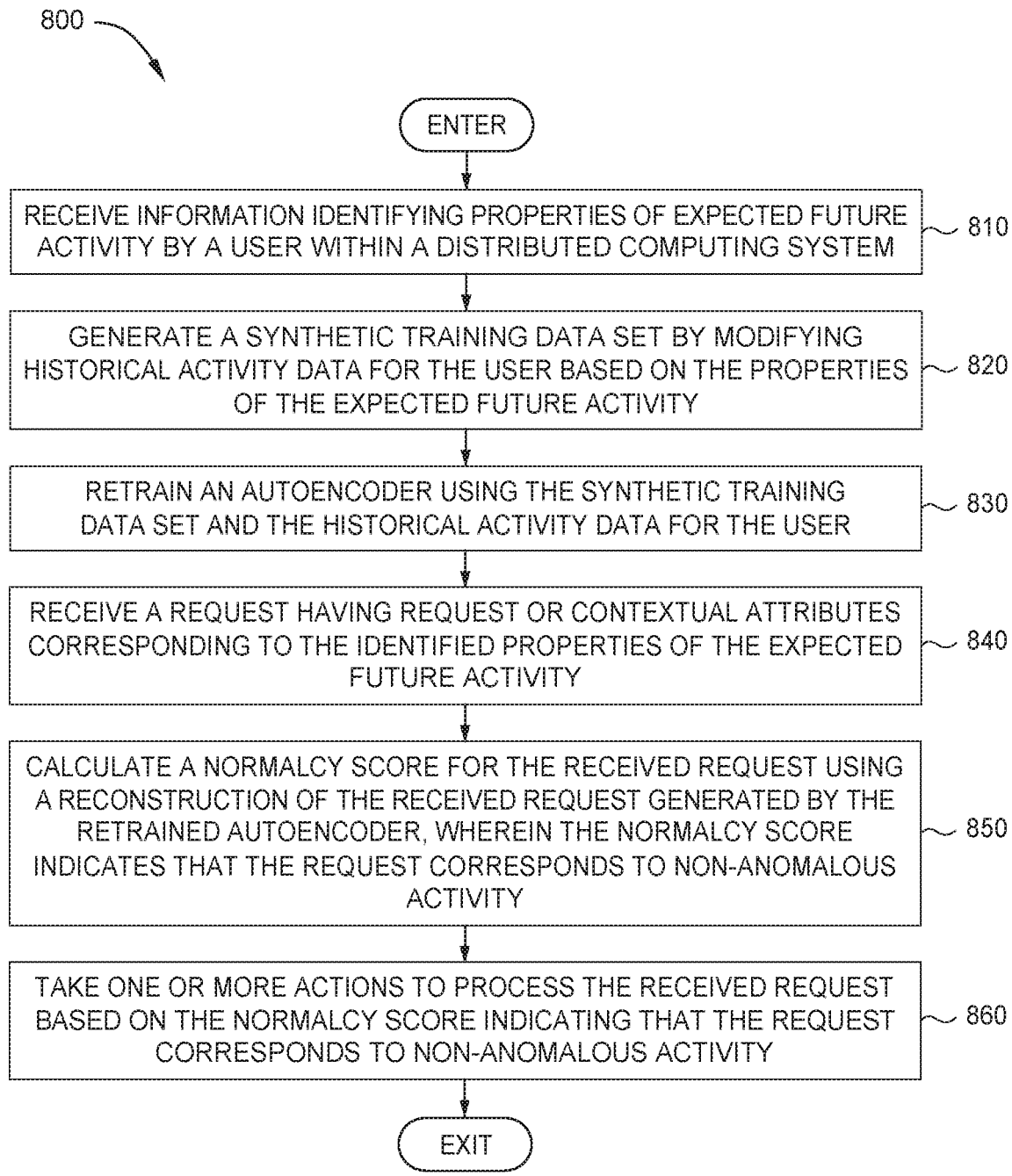
FIG. 8 illustrates example operations for training an autoencoder using historical user activity and a synthetic data set corresponding to expected future activity to identify the expected future activity as non-anomalous activity, according to one embodiment.

FIG. 8 illustrates example operations 800 for training an autoencoder using historical user activity and a synthetic data set generating based on existing historical log data and information about expected future user activity within a distributed computing system, according to an embodiment. As discussed, the generation of training data based on information about expected future user activity may be used to train an autoencoder to recognize expected activity as non-anomalous activity even though such activity may not have been encountered previously within the distributed computing environment (and thus would likely have been marked as potentially anomalous activity within the distributed computing environment).

As illustrated, operations 800 begin at block 810, where a system receives information indicating properties of expected future activity by a user within the distributed computing system. The properties of expected future activity may include, for example, expected times at which the user plans to initiate activity within the distributed computing system, expected locations from which the user plans to generate requests to perform activity within the distributed computing system, and other contextual information that may be used in a scoring model to determine a probability score indicating a likelihood that activity corresponds to anomalous or non-anomalous activity.

At block 820, the system generates a synthetic data set by modifying historical activity data based on the properties of the expected future activity. For example, if a user indicates that future activity may be generated from a network with a specified ASN, the system can modify the obtained historical activity data to replace ASNs included in the historical activity data with the specified ASN. In another example, a user indication of a location from which future requests are to be received may also be used to modify timestamp information in the obtained historical data. For example, if the user is presently located in California but expects to generate activity from New York in the future, the timestamps included in the obtained historical data may be modified to reflect the three-hour time zone difference between the user's current and expected future location.

At block 830, the system retrains an autoencoder based on the modified historical activity data. In some embodiments, the modified historical activity data may be combined with other training data from activity log data store 130 prior to providing a training data set to a model trainer for use in training the autoencoder. As discussed above, the autoencoder may be trained using various unsupervised learning techniques to generate normalcy scores for a request based on the request attributes and contextual information associated with the request.

At block 840, the system receives a request having request attributes or contextual attributes corresponding to the indicated properties of expected future activity by the user.

At block 850, the system calculates a normalcy score for the received request using the retrained request scoring model. The normalcy score may be calculated as a joint conditional probabilities for each request attribute in the received request, given various elements of user information as context. Because the retrained autoencoder may be retrained based on a synthetic data set including attributes corresponding to the expected future activity, the calculated normalcy score for the request may be calculated such that the request is indicated to correspond to non-anomalous activity within the computing environment (e.g., may be calculated from a probability distribution indicating that the received request is similar to at least one request in the training data set known to correspond to non-anomalous activity).

At block 860, the system takes one or more actions based on the normalcy score indicating that the received request corresponds to non-anomalous activity. As discussed, where a normalcy score for a request is generated in real-time, the system may allow execution of the request against the computing resources identified in the request. In another example, where a normalcy score is generated for a request that has previously been executed in the computing environment 100, the system may omit the request from a report identifying potentially anomalous activity within computing environment 100.

Figure 9:
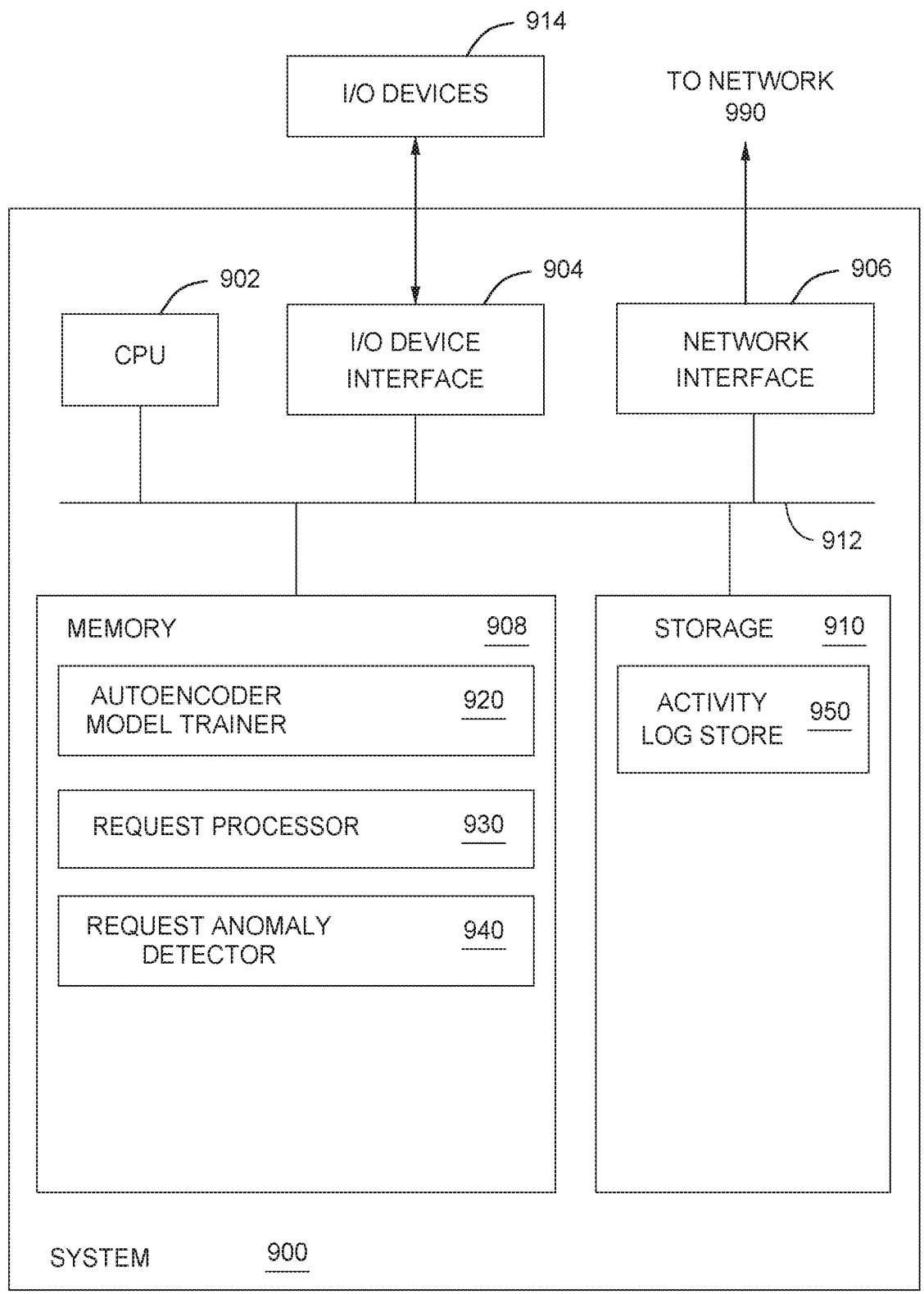
FIG. 9 illustrates an example computing system in which aspects of the present disclosure may be performed.

FIG. 9 illustrates an example system 900 for training an autoencoder and using the trained autoencoder to identify whether received requests correspond to non-anomalous or potentially anomalous activity, according to embodiments of the present disclosure.

As shown, system 900 includes a central processing unit (CPU) 902, one or more I/O device interfaces 904 that may allow for the connection of various I/O devices 914 (e.g., keyboards, displays, mouse devices, pen input, etc.) to the system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, memory 908, and storage 910. CPU 902 is included to be representative of a single CPU, multiple CPUs, a single CPU having multiple processing cores, and the like. Additionally, the memory 908 is included to be representative of a random access memory. Furthermore, the storage 910 may be a disk drive, solid state drive, or a collection of storage devices distributed across multiple storage systems. Although shown as a single unit, the storage 910 may be a combination of fixed and/or removable storage devices, such as fixed disc drives, removable memory cards or optical storage, network attached storage (NAS), or a storage area-network (SAN).

As shown, memory 908 generally includes an autoencoder trainer 920, a request processor 930, and a request anomaly detector 940. Generative model trainer 920 generally is configured to receive, as input, historical activity data (e.g., from activity log store 950 or a remote activity log data store 130), train an autoencoder to encode requests into and decode requests out of a latent space of the autoencoder and use probability information associated with the decoded requests to determine whether an incoming request corresponds to non-anomalous or potentially anomalous activity. Request processor 930 generally receives incoming requests, obtains a normalcy score from a request anomaly detector 940, and uses the obtained normalcy score to determine how to process a received request. Request anomaly detector 940 generally is configured to apply the autoencoder trained by autoencoder trainer 920 to information about an incoming request to generate a normalcy score indicative of whether the incoming request corresponds to non-anomalous or potentially anomalous activity.

Storage 910 generally comprises an activity log store 950. As discussed, activity log store 950 generally includes historical log data about requests received and processed within a distributed computing environment. The historical log data may include information about a requested event and contextual information about the request, such as a timestamp associated with the request, information about the location from which the request was received, user information corresponding to the request, and other information that may be used to train a scoring model to determine whether an incoming request corresponds to non-anomalous or potentially anomalous activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the anomaly detection system could execute on a computing system in the cloud and manage the execution of incoming requests on computing resources in the cloud based on whether the incoming requests correspond to anomalous or non-anomalous activity. In such a case, the anomaly detection system could train an anomaly detection model and use the anomaly detection model to determine whether incoming requests are anomalous or non-anomalous activity and store the trained anomaly detection model and training data used to generate the anomaly detection model at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for detecting potentially anomalous activity in a computing environment, comprising:
   receiving a training data set of requests executed within the computing environment, wherein each request in the training data set comprises a plurality of request attributes and a plurality of contextual attributes;
   training an autoencoder to reconstruct approximations of requests based on the received training data set, wherein training the autoencoder comprises:
     training an encoder neural network to encode requests into latent space representations of the requests; and
     training a decoder neural network to generate an approximate reconstruction of the requests from the latent space representations of the requests;
   receiving a request to invoke an action within the computing environment;
   generating a reconstruction of the request to invoke the action using the trained autoencoder;

calculating a normalcy score based on a probability that the reconstruction of the request exists in the training data set; and based on the calculated normalcy score, processing the request in the computing environment to allow execution of non-anomalous requests and block execution of potentially anomalous requests.

2. The method of claim 1, wherein the autoencoder comprises a variational autoencoder trained to maximize a conditional log-likelihood.

3. The method of claim 1, wherein the autoencoder comprises a Wasserstein autoencoder trained to minimize a Wasserstein distance between a probability distribution generated from the training data set and a probability distribution used to generate the reconstruction of the request.

4. The method of claim 1, wherein processing the request comprises including the request in a set of potentially anomalous requests, and wherein the method further comprises:

receiving information indicating that the request corresponds to non-anomalous activity; and retraining the autoencoder based on the received information so as to minimize reconstruction error for reconstructions of future requests having attributes similar to the request.

5. The method of claim 1, wherein processing the request comprises:

flagging the request as a potentially anomalous request based on a comparison of the generated normalcy score to a threshold value; and upon receiving confirmation that the request corresponds to non-anomalous activity, retraining the autoencoder based on the received request so as to generate a normalcy score above the threshold value for reconstructions of future requests having attributes similar to the request.

6. The method of claim 1, further comprising:

receiving information about properties of expected future requests within the computing environment that is expected to be flagged as potentially anomalous activity;

generating a synthetic training data set by modifying historical activity within the computing environment based on the properties of expected future requests within the computing environment; and retraining the autoencoder based on the synthetic training data set.

7. The method of claim 1, wherein the generating a reconstruction of the request comprises:

generating a vector including the invoked action, context information, and an identification of a system that generated the request;

mapping the vector to a code in a latent space using a second neural network; and generating an approximation of the invoked action and an approximation of the identification of the system that generated the request by decoding the code in the latent space using a third neural network.

8. The method of claim 7, wherein the context information comprises a representation of the context information in an embedding space, the representation being generated by mapping the context information into the representation of the context information using a first neural network.

9. The method of claim 7, wherein mapping the vector to the code in the latent space comprises:

processing the vector through a plurality of neural network layers;

determining parameters of a probability distribution generated by the plurality of neural network layers; and selecting the code based on the vector and the determined parameters.

10. The method of claim 7, wherein the third neural network comprises a plurality of neural network layers and a probability output layer for each of the invoked action and the identification of the system that generated the request.

11. A method for encoding requests to invoke an action in a computing environment into a latent space representation for anomaly detection, comprising:

receiving a request to invoke an action within the computing environment;

generating a vector representing the received request;

mapping the vector to a code in a latent space using an encoder neural network trained using a training data set of non-anomalous requests executed within the computing environment, the latent space including a plurality of representations of request attributes learned from the training data set of non-anomalous requests, and outputting the code in the latent space, the code comprising a compressed representation of one or more attributes of the received request from which an approximation of the one or more attributes of the received request can be reconstructed.

12. The method of claim 11, wherein:

the request comprises an identification of the invoked action, an identification of a system that generated the request, and one or more items of contextual information; and generating the vector representing received request comprises:

generating, using a first neural network, a context vector from the one or more items of contextual information; and combining the identification of the invoked action, the context vector, and the identification of the system that generated the request into a single vector.

13. The method of claim 11, wherein mapping the vector to the code in the latent space comprises:

processing the vector through a plurality of neural network layers;

determining parameters of a probability distribution generated by the plurality of neural network layers; and selecting the code based on the vector and the determined parameters of the probability distribution.

14. The method of claim 11, wherein the encoder is part of an autoencoder trained to minimize a divergence between a probability distribution generated from the training data set and a probability distribution used to generate a reconstruction of the request.

15. The method of claim 11, wherein the encoder is part of an autoencoder trained to minimize a Wasserstein distance between a probability distribution generated from the training data set and a probability distribution used to generate a reconstruction of the request.

16. A method for decoding requests to invoke an action in a computing environment from a latent space encoding of requests for anomaly detection, comprising:

receiving, from an encoder, an encoded representation of a request to invoke an action within the computing environment, the encoded representation comprising a code in a latent space including a plurality of codes representing request attributes learned from a training data set of non-anomalous requests;

reconstructing the request to invoke the action within the computing environment using a decoder neural network configured to reconstruct request attributes from the received encoded representation of the request;

calculating a normalcy score based on a probability that the reconstruction of the request exists in the training data set of non-anomalous requests; and based on the calculated normalcy score, taking an action to process the request.

17. The method of claim 16, wherein the encoded representation of the request to invoke the action within the computing environment comprises an encoded version of a vector including an identification of the invoked action, context information, and an identification of a system that generated the request.

18. The method of claim 17, wherein reconstructing the request comprises generating an approximation of the identification of the invoked action and an approximation of the identification of the system that generated the request, given the context information.

19. The method of claim 16, wherein the decoder is part of an autoencoder trained to minimize a divergence between a probability distribution generated from the training data set and a probability distribution used to generate the reconstruction of the request.

20. The method of claim 16, wherein the decoder is part of an autoencoder trained to minimize a Wasserstein distance between a probability distribution generated from the training data set and a probability distribution used to generate the reconstruction of the request.

* * * * *